United States Patent [19]

Cowan et al.

[11] 4,023,644
[45] May 17, 1977

[54] FLUID LAYER ACOUSTIC SHIELD FOR TURBOFAN JET PROPULSION ENGINE

[75] Inventors: Samuel Joseph Cowan, Seattle; John William Little, Bellevue, both of Wash.

[73] Assignee: The Boeing Company, Seattle, Wash.

[22] Filed: July 2, 1975

[21] Appl. No.: 592,544

[52] U.S. Cl. .................... 181/33 HA; 137/15.1; 181/33 HC; 181/51; 244/53 B; 415/119
[51] Int. Cl.² .................................... F02C 7/24
[58] Field of Search ............ 60/39.09 P; 137/15.1; 181/33 H, 33 HA, 33 HC, 51; 244/1 N, 53 B; 415/119

[56] References Cited

UNITED STATES PATENTS

| | | | |
|---|---|---|---|
| 2,636,666 | 4/1953 | Lombard | 60/39.09 D |
| 2,647,366 | 8/1953 | McCann | 60/39.09 D X |
| 2,783,008 | 2/1957 | Bodine | 181/33 HA |
| 3,481,427 | 12/1969 | Dobbs et al. | 181/33 HA |
| 3,533,486 | 10/1970 | Paulson | 181/50 |
| 3,535,928 | 1/1976 | Shah | 244/53 B X |

*Primary Examiner*—Lawrence R. Franklin
*Attorney, Agent, or Firm*—Christensen, O'Connor, Garrison & Havelka

[57] ABSTRACT

Noise generated by the tips of the fan blades in a turbofan jet propulsion engine is suppressed by generating an annular fluid layer or wake in the inlet of the turbofan engine forwardly from the fan blades and spaced inwardly from the inner wall of the inlet and by lining the inner wall of the inlet with an acoustically absorbent layer of material. Sound waves generated by the fan blades are reflected outwardly by the fluid layer and are absorbed in the acoustic absorbent layer on the inner wall of the inlet. In order for the wake to reflect sound waves, either the local fluid velocity in the wake must be lower than the fluid velocity of the surrounding airstream traveling through the inlet or the acoustic speed in the wake must be greater than or equal to the acoustic speed in the surrounding airstream. It is preferred that both conditions be met. The fluid layer can be created by an annular bluff body positioned in the inlet or by injecting a fluid from an annular plenum in a direction opposite to the flow of the airstream through the inlet.

21 Claims, 15 Drawing Figures

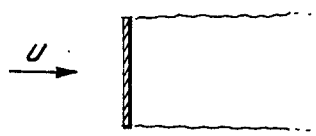
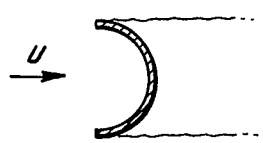
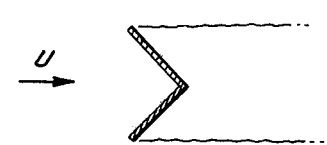
Fig. 5.   Fig. 6.   Fig. 7.
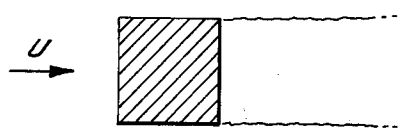
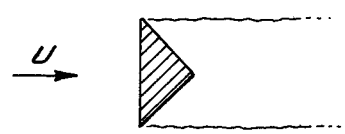
Fig. 8.   Fig. 9.
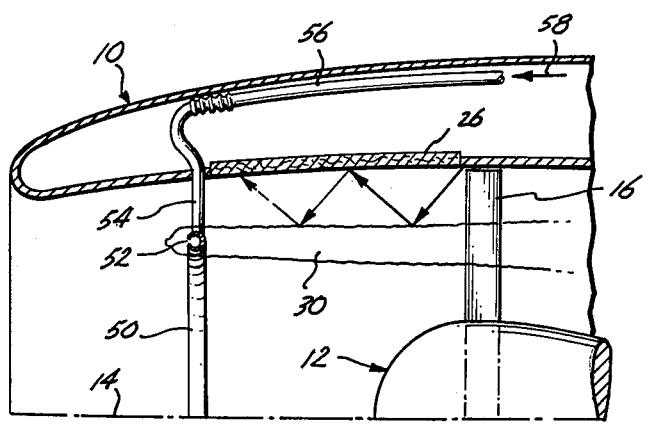
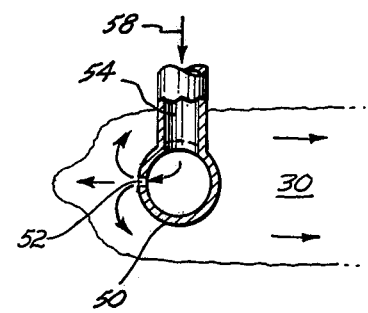
Fig. 12.   Fig. 13.
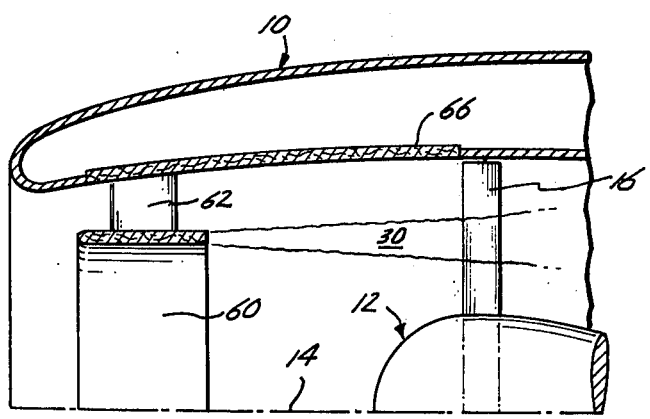
Fig. 14.

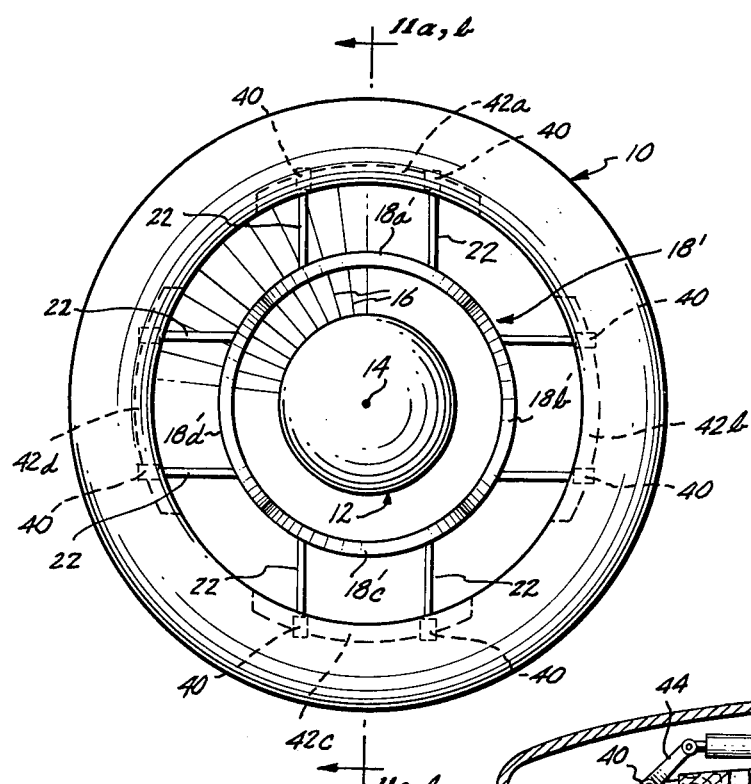
Fig. 10.
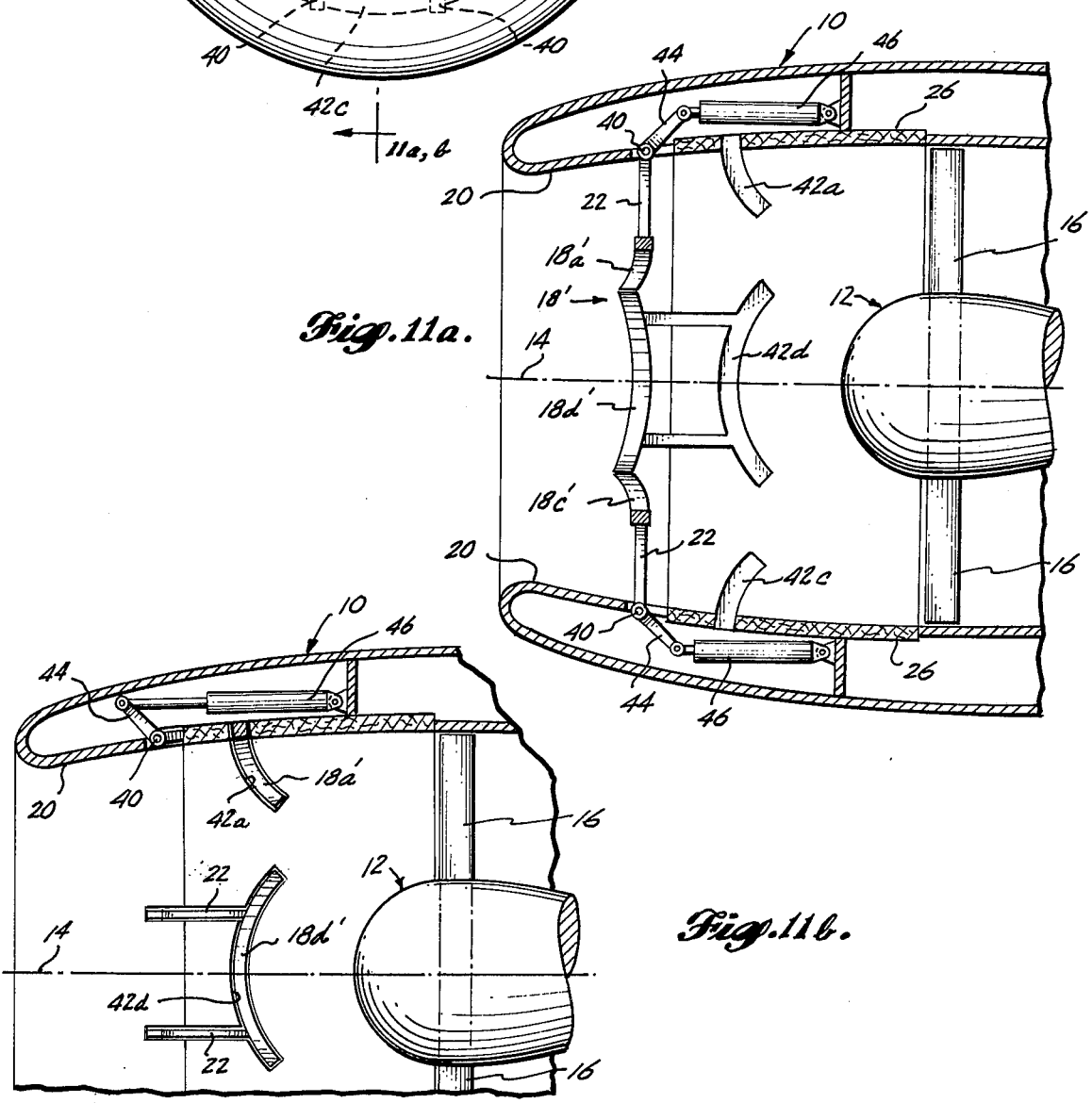
Fig. 11a.
Fig. 11b.

FLUID LAYER ACOUSTIC SHIELD FOR TURBOFAN JET PROPULSION ENGINE

BACKGROUND OF THE INVENTION

The present invention relates to a method and apparatus for suppressing noise normally propagating outwardly from within the inlet of a jet propulsion engine, and more particularly to a method and apparatus for suppressing the noise generated by the tips of the fan blades in a turbofan jet propulsion engine.

The tips of the fan blades of a turbofan jet propulsion engine travel at high velocities. At these velocities, sonic disturbances are generated in the airstream passing through the blades. These disturbances are propagated outwardly and forwardly through the opening of the inlet as sound waves. Attempts have been made to reduce the level of the sound waves propagated out of the inlet, but have not met with great success. One suggestion of the prior art for reducing the sound level of the forwardly propagated sound waves is to reduce the fan speed sufficiently to obtain low velocities at the tips of the fan blades. This suggestion is an inadequate solution as a high speed turbine cannot effectively drive a low speed fan without interposing a reduction gear box between the turbine and the fan. Gear boxes are undesirable in jet propulsion engines as they generate a substantial amount of noise themselves and add weight to the engine as well as presenting an initial cost and a continuing maintenance problem. Another suggestion for reducing the fan blade tip noise is to permanently position an acoustic shield, a member having at least a surface layer of acoustically treated material thereon, in the inlet as well as to line the inlet with acoustically absorbent material. These suggested remedies also have drawbacks, as the permanently positioned, prior art acoustic shields detrimentally affect engine performance under all operating conditions including those conditions when not required for noise reduction. In addition, prior art acoustic shields add a substantial amount of weight to the engines.

It is therefore an object of the present invention to provide an acoustic shield that will suppress the noise generated by the fan blade tips of a turbofan jet propulsion engine and propagated outwardly from the opening of the inlet of the engine. Further objects of the present invention are to provide: a lightweight acoustic shield; an acoustic shield that can be deployed to reduce the sound level created by the fan blade tips and that can be retracted when the sound level created by the engine is not a significant problem; to provide a sound attenuating device that does not significantly affect the operating characteristics of a turbofan jet propulsion engine either when retracted or deployed; to provide a relatively lightweight, easily manufactured sound attenuating device; and to provide several means for accomplishing the prime objective of suppressing the sound emissions from a turbofan jet propulsion engine.

SUMMARY OF THE INVENTION

In accordance with the foregoing objects, and other objects that will become apparent to one of ordinary skill upon reading the following specification, the present invention provides a method for suppressing noise, or attenuating sound waves, normally propagating outwardly from within the inlet of a turbofan jet propulsion engine. The method comprises the steps of generating a wake in the airstream traveling through the inlet so that the fluid in the wake has a velocity less than the velocity of the airstream surrounding the wake and so that the acoustic velocity in the fluid in the wake is greater than or equal to the acoustic velocity in the airstream. This enables the wake to reflect the sound waves generated aft of the forward portion of the wake so that they can be absorbed within the inlet before they propagate outwardly from the inlet. One apparatus for suppressing noise generated by the fan blade tips in accordance with the foregoing method comprises an annular body having a relatively large coefficient of drag, which body is positioned within the inlet at a location spaced inwardly from the inner wall of the inlet, radially outwardly from the longitudinal axis of the inlet, rearwardly from the inlet opening, and forwardly from the fan blades, to generate the reflecting wake. A layer of acoustically absorbent material is positioned radially outwardly from the body and the wake created by the body at a location adjacent the inner wall of the inlet to absorb the sound waves reflected by the wake. Another apparatus for suppressing noise in accordance with the foregoing method substitutes for the annular body a means for injecting a fluid into the airstream traveling through the inlet. The fluid is injected in a direction opposite to the direction of flow through the inlet to generate the wake.

BRIEF DESCRIPTION OF THE DRAWINGS

A better understanding of the present invention can be derived by reading the ensuing specification in conjunction with the accompanying drawings wherein:

FIGS. 5 through 9 are somewhat schematic cross-sectional views of various bluff bodies that will create the desired reflecting wake in accordance with the present invention;

FIG. 10 is a front view of the inlet and the deployed bluff body illustrated in FIG. 1;

FIG. 11a and 11b are partial longitudinal sectional view showing a bluff body similar to that of FIGS. 1 and 5, in a deployed position and a retracted position, respectively;

FIG. 12 is a simplified elevation view in partial longitudinal section of an alternate embodiment of the present invention for creating a reflective wake by injecting a fluid into the airstream traveling through the inlet;

FIG. 13 is an enlarged view in partial section of the device shown in FIG. 12 for injecting a fluid into the airstream traveling through the inlet; and FIG. 14 is a simplified elevation view in partial longitudinal section showing another alternative embodiment of the present invention.

DESCRIPTION OF PREFERRED EMBODIMENTS

In accordance with the present invention, a fluid wake is created in the airstream traveling from the opening of an inlet on a turbofan jet propulsion engine to and through the fan blades of the engine. Sound waves generated by the tips of the fan blades are reflected from the wake and absorbed in an acoustically absorbent material lining the inlet. The fluid wake can be generated in several ways as hereinafter set forth. Preferably, the fluid wake is annularly-shaped and surrounds the longitudinal axis or centerline of the turbofan engine. The wake preferably has a finite thickness substantially less than the radial dimension of the inside of the inlet. The fluid wake must be spaced inwardly from the inner wall of the inlet. The front or leading portion of the fluid wake can be formed or generated at any location forwardly from the fan blades, but is preferably generated at a location rearwardly from the inlet opening. In order for sound waves to be reflected from the outer surface of the wake, i.e., the boundary or interface between the wake and the surrounding airstream, either the local fluid velocity within the wake must be lower than the fluid velocity in the airstream surrounding the wake, that is, the airstream both inside and outside of the wake, or the acoustic speed (or the speed of sound) in the fluid in the wake must be greater than the acoustic speed in the airstream surrounding the wake. Preferably, both of the foregoing conditions are present to achieve maximum reflection of sound waves. Sound reflected from the wake is absorbed in accordance with the present invention in an annularly-shaped layer of acoustically absorbent material that lines the inner wall of the inlet. Preferably, the acoustic material extends longitudinally from a location immediately in front of the fan blades to a location spaced radially outwardly from or forwardly of the leading portion of the wake.

Figure 1:
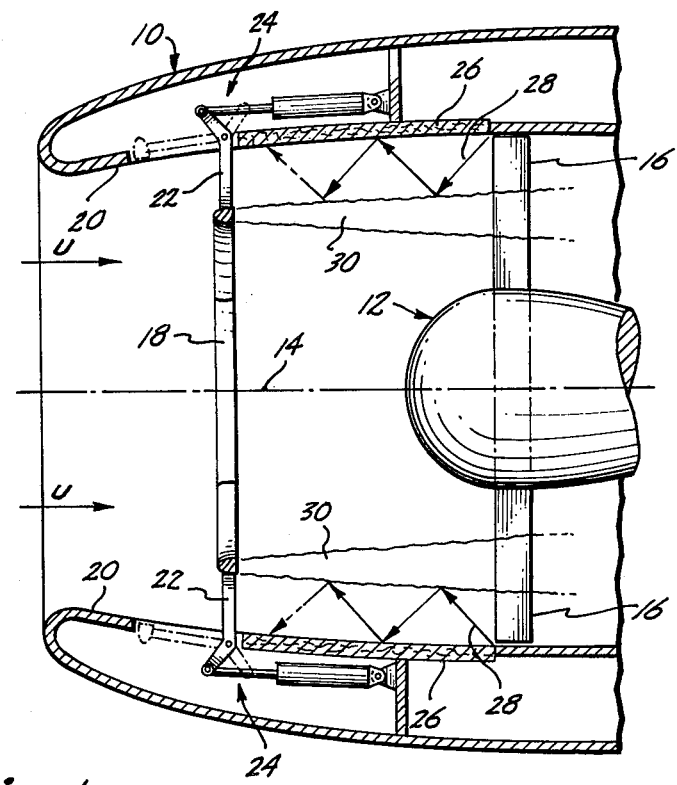
FIG. 1 is a simplified elevation view in partial longitudinal section of the inlet and fan of a turbofan jet propulsion engine illustrating an annularly-shaped bluff body deployed in the inlet and an acoustically absorbent layer lining the inlet rearwardly from the bluff body.

Referring first to FIG. 1, an inlet 10 of a turbofan jet propulsion engine channels air to a fan 12 mounted on the longitudinal centerline 14 of the engine in the direction of arrows U. The fan carries a plurality of blades 16 mounted for rotation about the longitudinal centerline 14 of the engine. An annular bluff body 18 is positioned in the forward portion of the inlet. The bluff body 18 is annularly-shaped and is continuous in the circumferential dimension. The bluff body 18 has its outer periphery spaced inwardly from the inner wall 20 of the inlet 10. The inner wall of the bluff body 18 is spaced outwardly from the longitudinal centerline 14 of the turbofan engine. The axis of the bluff body 18 is oriented concentrically with the longitudinal centerline 14. The bluff body 18 is mounted by a plurality of arms 22 coupling the bluff body to a retraction and deployment mechanism 24 located between the inner and outer walls of the inlet 10. A wake 30 is generated by the air flowing past the bluff body that passes down the inlet and through the fan blades of the turbofan engine. Very little additional noise is created by the interaction of the wake with the fan blades 16 because the blades are always in the wake and do not periodically intersect it as they rotate. In accordance with the present invention, the fluid velocity in the wake 30 will be reduced relative to the fluid velocity in the surrounding airstream, which provides a requisite condition for the acoustic reflection.

An annularly-shaped layer 26 of acoustically absorbent material such as a Helmholtz resonator or a bulk acoustic absorber, both of which are state of the art acoustic attenuating devices, is positioned in an outwardly extending, inwardly opening cavity provided in the inner wall 20 of the inlet 10. The inner surface of the acoustic attenuating layer 26 fairs smoothly with and forms a rearward continuation of the inner wall 20 of the inlet. Sound waves generated at the outer tips of the fan blades 16, generally represented by the arrows 28, are directed inwardly toward the wake 30 generated by the bluff body 18 in the airstream traveling into the inlet from its forward opening. The wake 30 has a finite thickness, is cylindrical in configuration, and forms a continuous layer in the circumferential dimension. The wake is interposed between the inner surface of the acoustic wave attenuating layer 26 and the longitudinal axis of the engine. The acoustic waves 28 travel inwardly toward the outer surface of the wake 30 and, because of the physical characteristics of the layer as set forth above and as more completely defined below, are reflected outwardly toward the attenuating layer 26. A portion of the initially reflected acoustic waves 28 is absorbed in the layer 26 while a small portion of the sound waves is reflected from the attenuating layer 26. The sound waves reflected from the attenuating layer 26 are again directed toward the outer surface of the wake 30 and again reflected toward the attenuating layer 26, wherein an additional portion of the reflected sound waves is attenuated. In this manner, a large proportion of the sound generated at the blade tips of the turbofan engine is reflected from the wake and suppressed by the attenuating layer 26.

Figure 2:
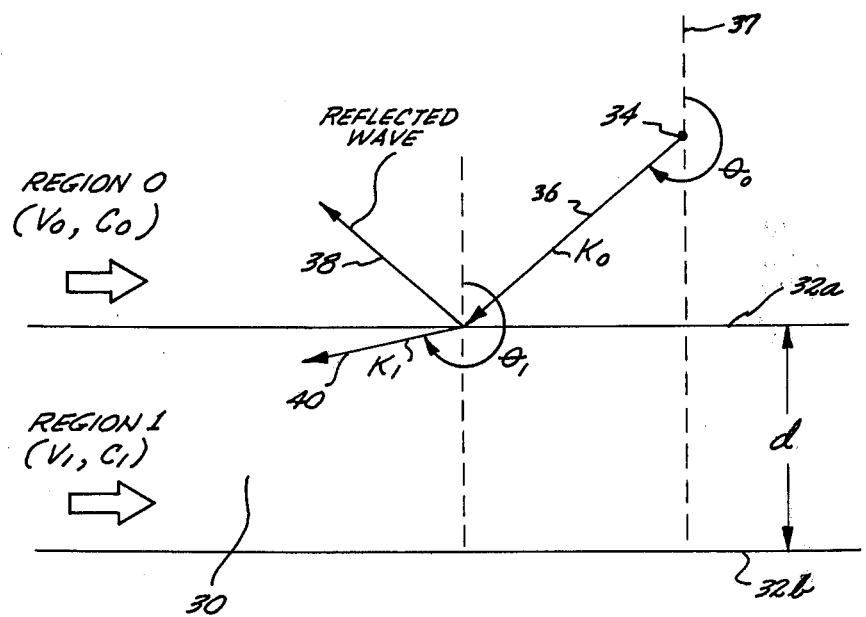
FIG. 2 is a vector diagram illustrating a sound wave generated in a first region (0) as it enters the boundary between the first region and a second region (1)

Referring to FIG. 2, the region 0 is representative of the airstream traveling through the inlet 10 between the wake 30 and the inner wall 20 of the inlet and the inner surface of the attenuating layer 26. The region 1 is representative of the wake 30 created by the bluff body 18 (FIG. 1). The wake 30 in FIG. 2 is represented as having a thickness $d$ with the horizontal lines 32a and 32b representing the outer and inner boundaries, respectively, of the wake. For purposes of mathematical analysis, a sound having a wave number $K_0$ originates at a point source 34. The sound wave 36 is represented as a vector quantity emanating from the point source 34 at an angle $\theta_0$ relative to the radial dimension, represented by the line 37, of the engine. A wave reflected from the outer boundary 32a of the wake 30 is represented as the vector quantity 38. For purposes of representation, the vector quantity 40 having a wave number $K_1$ represents a disturbance created in region 1 (wake 30) when the incident wave 36 intersects the outer boundary 32a of region 1.

The reflection of the sound by the wake 30 in region 1 is predicted by acoustic theory based on conservation of wave number (tangent component) and phase velocity (tangent component) as the acoustic wave attempts to penetrate the fluid layer (or pass through the boundary 32a of the fluid layer). Thus, according to Snell's law, the conservation of wave number is represented by the equation:

$$K_0 \sin \theta_0 = K_1 \sin \theta_1 \qquad (1)$$

wherein $\theta_1$ is the angle that the wave 40 having a wave number $K_1$ makes with the radial dimension of the engine after intersecting the boundary layer 32a. The conservation of phase velocity is represented by the equation:

$$K_0 (V_0 \sin\theta_0 + C_0) = K_1 (V_1 \sin\theta_1 + C_1) \qquad (2)$$

wherein $V_0$ is the fluid velocity in region 0, $C_0$ is the acoustic velocity (or speed of sound) in the region 0, $V_1$ is the local fluid velocity in the region 1 (wake 30) and $C_1$ is the acoustic velocity in region 1 (wake 30). In order for a sound wave to be totally reflected from the outer boundary 32a of the region 1, $\theta_1$ must be at least equal to 270° (i.e., the sin of $\theta_1$ must equal $-1$). Solving equations 1 and 2 for $\sin\theta_0$, using $\sin\theta_1 = -1$, and $M_0$ (the Mach number in region 0) equal to $V_0/C_0$, and $M_1$ (the Mach number in region 1) equal to $V_1/C_1$, and noting that $$\frac{C_1}{C_0} = \frac{\sqrt{\gamma_1 T_1}}{\sqrt{\gamma_0 T_0}} \qquad (3)$$

wherein, $\gamma_0$ and $\gamma_1$, are the specific heat ratios of the fluid medium in regions 0 and 1, respectively, $T_0$ and $T_1$ are the absolute static temperatures of the fluid medium in regions 0 and 1, respectively, gives a value for $\theta_0$ cutoff as follows:

$$\theta_{0\ cutoff} = \sin^{-1}\left[\frac{1}{\sqrt{\frac{\gamma_1 T_1}{\gamma_0 T_0}}(M_1 - 1) - M_0}\right] \qquad (4)$$

$\theta_{0\ cutoff}$ is the value of the incident wave angle, $\theta_0$ for which total reflection from the wake 30 will occur. Thus, all incident waves having an angle between $\theta_{cutoff}$ and 270° are reflected by the fluid layer formed by the wake 30.

The thickness (d) of the wake and the frequency of the generated sound wave will determine the portion of the sound waves that will be transmitted through the wake. Thus, the amount of transmission is dependent in part upon the parameter $K_0 d$. For a relatively thick wake, i.e. a large d, the transmission loss is high for relatively low frequency sound waves and for all frequencies above such low frequenices. As the fluid layer becomes thinner, more low frequency sound will be transmitted through the layer. Since fan noise is a relatively high frequency noise, the thickness d of the layer need not for most applications be greater than on the order of 5 centimeters (2 inches).

Figure 3:
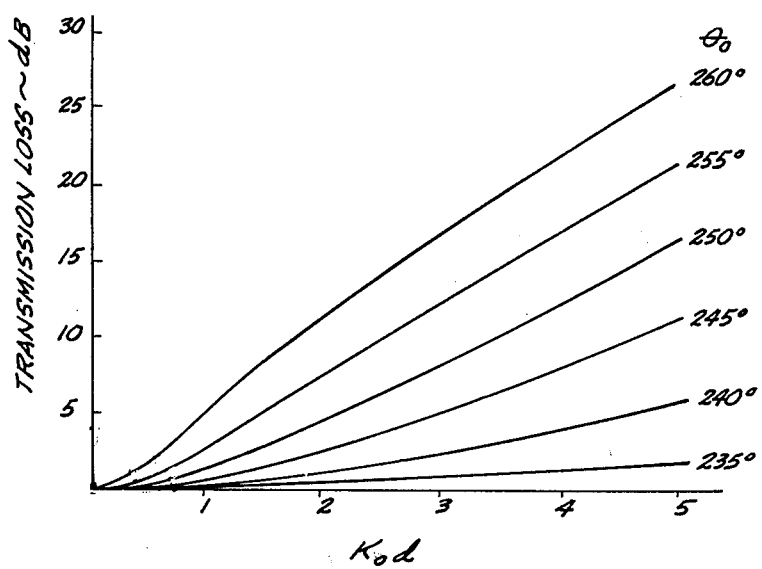
FIG. 3 is a graph of the sound transmission loss in decibels at various cut-off angles versus the quantity comprising the wave number ($K_0$) of the generated wave times the thickness ($d$) of the wake.

Given the wave number $K_0$ of the sound generated by the fan blades and given the other engine parameters described above, the required thickness of the fluid layer formed by the wake can be calculated by reference to the graph of FIG. 3. The transmission loss across the layer in decibels, is represented on the abscissa of the graph. The transmission loss achieved for a given $K_0 d$ and a series of given incidence angles ($\theta_0$) have been plotted in the graph. These curves are plotted by solving the equations set forth in C. Yeh's article "A Further Note on the Reflection and Transmission of Sound Waves by a Moving Fluid Layer," *J. Acoust. Soc. Am.*, vol. 43, no. 6, pp. 1454–1455, 1968, expressly incorporated herein be reference. These equations and their application are further discussed in AIAA paper No. 73-1002, entitled "Transmission of Sound Through a Two-Dimensional Shielding Jet," Cowan, S. J. and Crouch, R. W., AIAA Aero-Acoustics Conference, Seattle, Wash., Oct. 15–17, 1973, also expressly incorporated herein by reference. Thus for a given wave number ($K_0$) and for a given angle of incidence ($\theta_0$) for a sound wave, the desired transmission loss can be located on the ordinates of the graph of FIG. 3 and the parameter $K_0 d$ found on the abscissa. By dividing the abscissa parameter by the wave number $K_0$ of a given sound wave, the required thickness of the fluid layer to achieve the desired transmission loss for that sound wave can be calculated. For purposes of solving Yeh's equations it is to be noted that transmission loss is a function of several parameters as follows:

$$T = f(M_0, M_1, M_2, C_1/C_0\theta_0, K_0 d) \qquad (5)$$

wherein $T$ is the transmission loss in decibels, $M_0$ is the mach number of the fluid on one side of the wake, $M_1$ is the mach number of the fluid in the wake, $M_2$ is the mach number of the fluid on the opposite side of the wake, $C_1$ is the acoustic velocity in the wake, $C_0$ is the acoustic velocity of the fluid on the one side of the wake and $C_2$ is the acoustic velocity of the fluid on the other side of the wake, $\theta_0$ is the incidence angle of the sound wave emanating from the one side of the wake, $K_0$ is the wave number of the sound wave and $d$ is the thickness of the fluid layer (or wake). The values for $M$ and $C$ must be assumed for purposes of calculating the curves of FIG. 3. These values are determined by the fluid system in which the wake is being or is to be generated.

Figure 4:
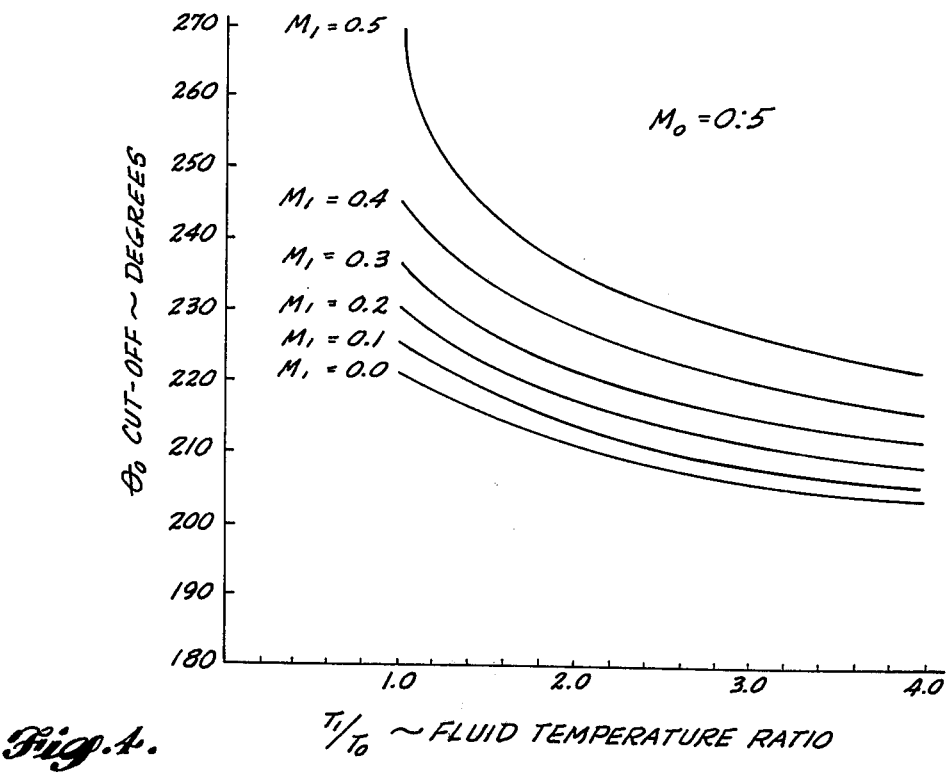
FIG. 4 is a graph of the cut-off angle of an incident sound wave versus the fluid temperature ratio between the region outside the wake and the region inside the wake for several wake Mach numbers.

FIG. 4 is a graph of the cut-off angles of incidence ($\theta_0$ cutoff) in degrees for various Mach numbers in the wake, assuming a constant Mach number in region 0 of 0.5 (i.e., $M_0 = 0.5$), versus the ratio of the absolute static fluid temperature in the wake ($T_1$) divided by the absolute static fluid temperature of the fluid in region 0 ($T_0$). FIG. 4 shows that the cut-off angle and thus the range of angles over which an incident sound wave will be reflected is dependent upon the acoustic velocity in the region in which the acoustic wave is generated and the acoustic velocity in the wake itself, as well as being dependent upon the relative temperatures of the two regions (region 0 and region 1).

From the foregoing explanation it can be understood that the wake generated in the airstream in the inlet of a jet propulsion engine must have a predeterminable thickness and must have a large velocity deficit (i.e., the fluid in the wake is slowed down significantly) relative to the fluid surrounding the wake in the airstream in order to effectively suppress noise generated by the engine. Since it can be shown that the coefficient of drag ($C_D$) of any object located within a stream of flowing fluid in inversely proportional to $\rho v$ where $\rho$ is the density of the fluid and $v$ is the fluid velocity, it can be recognized that the bluff bodies of this invention can be conveniently specified in terms of the parameter $C_D$. Specification of the bluff bodies in this manner is especially advantageous in that the coefficient of drag is a well known parameter to aeronautical engineers that commonly design gas turbine inlet structure. In this respect, it has been determined that bluff bodies exhibiting a $C_D$ of about 1.5 or more provide a wake having a sufficiently large velocity deficit. FIGS. 5 through 9 illustrate several different bluff body geometries that will create such a wake in the airstream. FIG. 5 illustrates a flat faced plate that is oriented in the airstream so that its parallel, forwardly and rearwardly facing surfaces are oriented perpendicularly to the longitudinal centerline of the engine and perpendicularly to the direction of air flow through the inlet. FIG. 6 illustrates a bluff body having a semicircular cross-section wherein the convex surface opens in a direction opposite to the direction in which the airstream is flowing. FIG. 7 illustrates a V-shaped bluff body wherein the apex of the V is pointing in the direction of the flow of the airstream through the inlet, i.e., the open portion of the V faces toward the opening to the inlet. FIG. 8 illustrates a bluff body having a square or rectangular cross-section wherein two of the parallel faces of the rectangular body are oriented perpendicularly to the direction of air flow through the inlet and perpendicularly to the longitudinal centerline of the engine. FIG. 9 illustrates a wedge-shaped bluff body having a flat side facing in a direction opposite to the flow of air through the inlet. The apex of the wedge opposite the flat side points in the direction of flow of the airstream.

Referring now to FIGS. 10, 11a and 11b a preferred configuration of the wake generating bluff body 18' is illustrated in its deployed position surrounding the longitudinal axis 14 of the turbofan engine and spaced inwardly from the inner wall 20 of the inlet 10. In this embodiment the bluff body 18' is divided into four segments 18'a, 18'b, 18'c and 18'd, which when deployed form in the front view an annular member. The bluff body is mounted for fore and aft swinging movement on arms 22 pivotally connected to hinge members 40 mounted within the inner and outer walls of the inlet 10. In FIGS. 11a and 11b, the bluff body 18' is shown in partial section. Each segment 18'a-d of the body is a bar that is formed into a compound curve. When deployed, the segments are curved both in the circumferential dimension relative to the longitudinal axis 14 of the engine and convexly in the forward longitudinal direction. Outwardly extending cavities 42a, 42b, 42c and 42d open inwardly from the inner wall 20 of the inlet and from the acoustic absorbent layer 26 lining the inlet. The cavities are positioned and oriented so that, when the segments 18'a-d are swung approximately 90° rearwardly about their respective hinge points 40 from the deployed position, they will recess into respective ones of the cavities 42a-42d. The curvature of the arms 22 and the convex curvature of the segments in the longitudinal dimension are designed to conform to and fair into the interior surface curvature of the inner wall 20 and the acoustic layer 26 when the segments 18'a-d are retracted and recessed into the cavities 42a-42d as shown in FIG. 11b. In this manner the wake generating body can be removed from the inlet so that it does not detrimentally affect the operating characteristics of the engine when noise suppression is not a major concern.

An identical deployment and retraction mechanism 24 is provided for each of the segments 18'a-d. For purposes of describing all the retraction and deployment mechanisms, the upper mechanism comprises a coupling arm 44 having one end fixed to the mounting arm 22 within the inlet 10 adjacent the hinge location 40. The opposite end of the arm 44 is pivotally coupled to the piston rod of a piston and cylinder assembly 46 mounted between the inner and outer skins of the inlet 10. When the piston arm is retracted, the coupling arm 44 swings the mounting arms 22 as well as the bluff body segment 18'a into the deployed position. At the same time, identical retraction and deployment mechanisms swing the remaining segments into positions to form a continuous bluff body in the circumferential dimension about the longitudinal axis 14 of the engine. When the piston arm of the piston and cylinder assemblies 46 is extended, the coupling arm 44 swings the mounting arms 22 through approximately 90° to recess the mounting arms 22 and the segments 18'a-d in their respective recesses 42a-42d.

As can be seen by reference to FIG. 4, the cut-off angle is dependent upon the acoustic velocity in the fluid layer comprising the wake and is furthermore dependent upon the temperature of the fluid in the wake. As the acoustic velocity and the temperature of the fluid in the wake increases relative to the surrounding airstream, the cut-off angles becomes smaller. As the cut-off angle becomes smaller sonic waves directed over a wider range incidence of angles will be reflected from the fluid wake. It follows that a fluid having a lower density and/or a higher temperature can be injected into the airstream entering and traveling through the inlet to enhance or magnify the achievable sound suppression in accordance with the present invention.

Referring now to FIGS. 12 and 13 a means for injecting fluid into the airstream entering the inlet to form a wake is illustrated. In this embodiment a tubular member 50 having an annular shape is positioned in the airstream entering the inlet 10. The tubular member is positioned at a location within the inlet ring similarly to the bluff body illustrated in FIG. 1. The tubular member has a forwardly opening annular slot 52 through which fluid is exhausted from the interior of the tubular member 50 and directed in a forward direction relative to the airstream traveling rearwardly through the inlet ring. The tubular member 50 is supplied with fluid via a mounting arm and conduit 54 in turn coupled to a second conduit 56 that is coupled to a source of fluid represented by arrow 58. If the fluid entering the tubular member 50 has the same temperature as the airstream, the forward injection direction will cause a velocity decrease in the wake 30', thus allowing the wake to serve as a reflecting layer. If desired, a hated fluid such as can be bled from the gas turbine driving the turbofan engine can be injected into the airstream through the tubular member 50 to further enhance the capability of the wake 30' to reflect sound waves by increasing the wake fluid temperature. Furthermore, a source of low density fluid, such as helium can be supplied to the tubular member 50, to further enhance the capability of the wake to reflect sound originating at the tips of the fan blades 16.

Referring to FIG. 14 another embodiment of the present invention is illustrated. In this embodiment an annular bluff body 60 is positioned in a location generally the same as that illustrated and described in conjunction with FIG. 1. This bluff body 60 has a relatively long longitudinal dimension relative to the longitudinal axis 14 of the turbofan engine. The bluff body 60 is mounted by a plurality of radially oriented, circumferentially spaced, mounting arms 62 to the inlet 10. The bluff body 60 is composed of or is covered with an outwardly facing layer of an acoustically absorbent material. Sound waves reflected from the outer lining 66 that strike the bluff body 66 will be further absorbed by the acoustically absorbent material on the bluff body 60, thereby enhancing the suppression capability of the system.

The present invention has been described in conjunction with a preferred embodiment and several alternative embodiments. One of ordinary skill in the art after reading the foregoing specification will be able to effect various changes, substitutions of equivalents and other alterations without departing from the scope and intent of the invention disclosed herein. For example, rather than injecting a heated fluid into the inlet airstream as described above, the bluff body itself can be heated with electrical energy or by flowing a heated fluid through a channel in the bluff body, thereby transferring heat to the wake to increase its ability to reflect acoustic waves. It is therefore intended that the protection granted by patent be limited only by the definition of the invention contained in the appended claims.

What is claimed is:

1. A method for suppressing noise normally propagating outwardly from within an inlet of a turbofan jet propulsion engine, said inlet having an axis and an inner wall, said method comprising the steps of:
generating a wake in the airstream traveling through said inlet, said wake having at least one of the following properties,
a. the fluid in said wake having a velocity less than the velocity of the airstream surrounding said wake, and
b. the acoustic velocity in the fluid in said wake being greater than the acoustic velocity in said airstream, said wake being located in said inlet so as to reflect sound waves generated aft of the inlet opening, and absorbing at least a portion of the reflected sound waves within the inlet.

2. The method of claim 1 wherein the wake comprises a fluid having a lesser density than the airstream surrounding said wake.

3. The method of claim 1 wherein the wake comprises a fluid having a higher temperature than the airstream surrounding said wake.

4. The method of claim 1 wherein said wake has an annular transverse section relative to the direction of flow of said airstream through said inlet.

5. The method of claim 4 further comprising:
positioning said wake radially inwardly from the inner wall of said inlet.

6. The method of claim 5 further comprising:
absorbing sound waves originating radially outwardly from said wake and reflected from said wake at a location adjacent the inner wall of the inlet.

7. The method of claim 6 wherein said sound waves reflected from said wake are absorbed by lining the inner wall of said inlet with an acoustically absorbent material.

8. The method of claim 1 wherein said wake is generated by positioning an annularly-shaped body having a relatively high coefficient of drag in the inlet aft of the opening of said inlet and positioning said body concentrically about the axis of said inlet.

9. The method of claim 8 further comprising:
forming said annularly-shaped body from an acoustically absorbent material.

10. The method of claim 1 wherein said wake is formed by injecting a fluid into said airstream traveling through said inlet in a direction generally opposed to the direction of flow of said airstream.

11. The method of claim 10 wherein said fluid has a density of less than the density of said airstream.

12. The method of claim 10 wherein said fluid has a temperature higher than the temperature of said airstream.

13. The method of claim 10 wherein said fluid is injected in an annular pattern surrounding the axis of said inlet.

14. The method of claim 13 wherein said wake is continuous in the circumferential dimension relative to the inlet.

15. An apparatus for suppressing noise generated by the tips of the fan blades in a turbofan jet propulsion engine, said engine including an inlet having a longitudinal axis, an inlet opening and an inner wall, comprising:
means associated with said inlet for generating a wake in the airstream traveling through said inlet, said means being so constructed and oriented within said inlet so as to form an annularly-shaped wake and so as to locate said wake inwardly from the inner wall of said inlet, radially outwardly from the longitudinal axis of said inlet, and forwardly from said fan blades, and
a layer of acoustically absorbent material, said layer being positioned adjacent said inner wall, forwardly from said fan blades, and rearwardly from said means for generating said wake.

16. The apparatus of claim 15 wherein said means comprises:
an annular member positioned within said inlet, said member having a forwardly facing substantially annular slot therein and a channel therein in fluid communication with said slot, and
means for supplying a pressurized fluid to said channel so that said fluid can be injected in a forward direction into said inlet from said slot to generate said wake.

17. The apparatus of claim 15 wherein said means comprises:
an annular body having a relatively large coefficient of drag, said body being positioned within said inlet at a location spaced inwardly from the inner wall of said inlet, radially outwardly from the longitudinal axis of said inlet, ring, rearwardly from said inlet opening, and forwardly from said fan blades, and
means for retracting said annular body into a cavity provided therefor in said inlet when not in use and for extending said annular body into its position within said inlet.

18. The apparatus of claim 17 wherein said annular body has a coefficient of drag at least about 1.5.

19. The apparatus of claim 15 further comprising:
a radially outwardly facing surface layer of acoustically absorbent material on said means for generating said wake.

20. The apparatus of claim 15 wherein said means for generating a wake projects into said inlet from said inner wall, said apparatus further comprising:
retraction means for retracting said means for generating a wake into a cavity provided therefore in said inlet when said means for generating a wake is not in use and for extending said means for generating a wake into its position projecting into said inlet from said inner wall.

21. An apparatus for suppressing noise generated by the tips of the fan blades in a turbofan jet propulsion engine, said engine including an inlet having a longitudinal axis, an inlet opening, and an inner wall, said apparatus comprising:
means for injecting a fluid into said inlet, said means directing said fluid in a forward direction relative to said inlet, said means directing said fluid along an annular path positioned within said inlet at a location spaced inwardly from the inner wall of said inlet, radially outwardly from the longitudinal axis of said inlet, ring, rearwardly from said inlet opening, and forwardly from said fan blades, and a layer of acoustically absorbent material, said layer being positioned adjacent said inner wall, forwardly from said fan blades, and rearwardly from the location at which said fluid is injected into said inlet.

* * * * *

UNITED STATES PATENT AND TRADEMARK OFFICE
CERTIFICATE OF CORRECTION

PATENT NO. : 4,023,644
DATED : May 17, 1977
INVENTOR(S) : Samuel Joseph Cowan et al.

It is certified that error appears in the above-identified patent and that said Letters Patent are hereby corrected as shown below:

Column 5, line 28, the word "cutoff" should be in italics and subscript.

Column 5, line 65, delete the word "be" and insert therefor —by—.

Column 6, line 15, delete the equation "$T=f(M_0, M_1, M_2, C_1/C_0\Theta_0, K_0d)$ and insert therefor —$T=f(M_0, M_1, M_2, C_1/C_0, C_2/C_0, \Theta_0, K_0d)$—.

Column 8, line 41, delete the word "hated" and insert therefor —heated—.

Signed and Sealed this sixteenth Day of August 1977

[SEAL]

Attest:

RUTH C. MASON
*Attesting Officer*

C. MARSHALL DANN
*Commissioner of Patents and Trademarks*